United States Patent [19]

Ma

[11] 4,012,184

[45] Mar. 15, 1977

[54] FORTUNE COOKIE MACHINE

[76] Inventor: Kwok Chuen Ma, 144 Hester St., New York, N.Y. 10013

[22] Filed: May 21, 1975

[21] Appl. No.: 579,346

[52] U.S. Cl. .............................. 425/112; 99/450.1; 425/500

[51] Int. Cl.² ........................................ B29D 23/03

[58] Field of Search .......... 425/383, 500, 515, 518, 425/112; 99/450.1

[56] References Cited

UNITED STATES PATENTS

| 3,265,016 | 8/1966 | Cheung | 425/112 |
|---|---|---|---|
| 3,420,194 | 1/1969 | Schaffer | 99/450.1 |
| 3,605,642 | 9/1971 | Brown | 425/500 |
| 3,894,829 | 7/1975 | Brunner et al. | 425/500 |

Primary Examiner—Francis S. Husar
Assistant Examiner—William R. Briggs
Attorney, Agent, or Firm—Frank J. Jordan

[57] ABSTRACT

Fortune cookie making apparatus includes a plurality of pivotally connected carriers arranged in an endless closed loop. Each of the carriers has at least one mold for receiving dough which is fed to molds in the carriers by feeding means fixedly disposed adjacent the closed loop. Paper feeding means fixedly disposed adjacent the closed loop deposits a length of paper on the cookie in the mold, and actuating wheel means disposed along the path of travel of the carriers receives the cookie and folds the latter along two parallel fold lines. An operating wheel means is operable to receive the cookie from the actuating wheel means and effect a second fold on the cookie to thereby form a fortune cookie.

9 Claims, 17 Drawing Figures

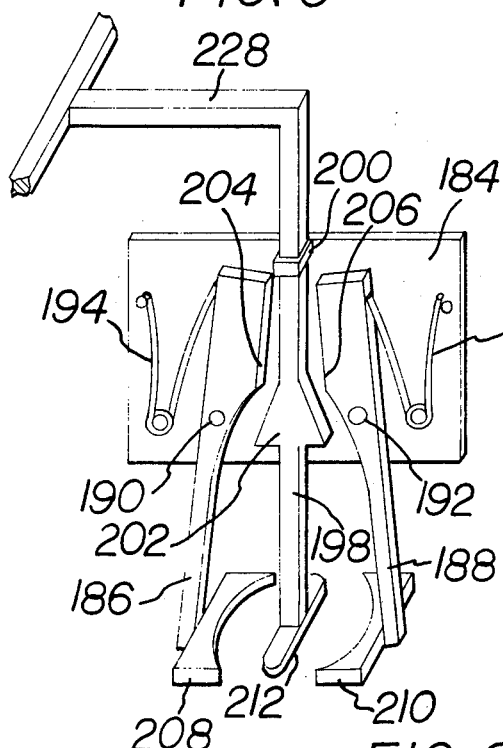
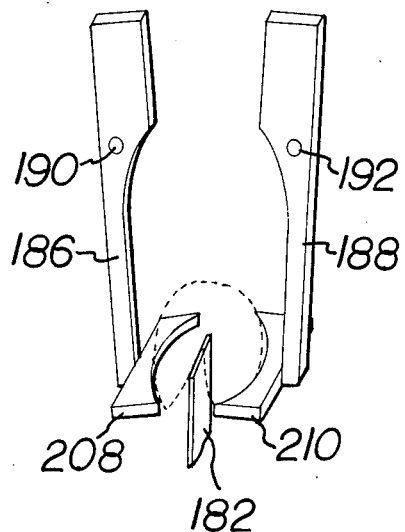
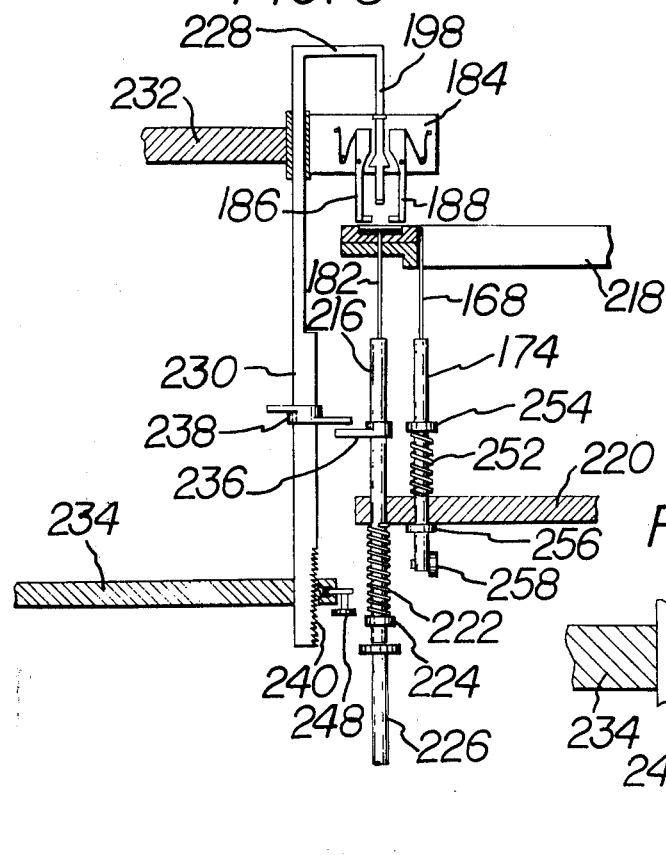

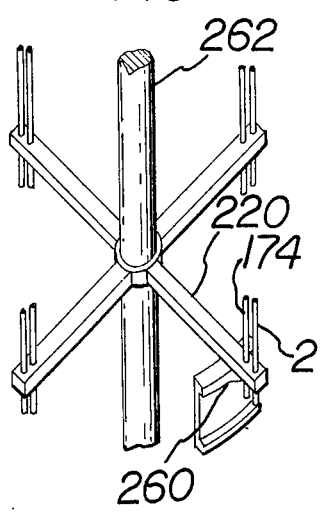
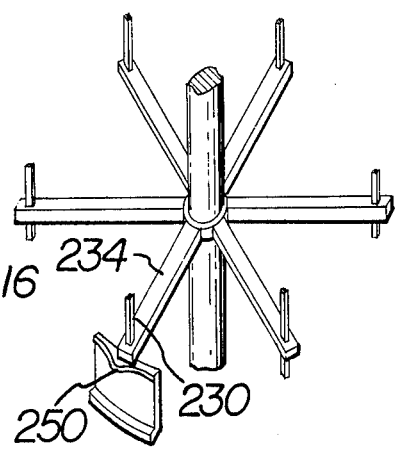
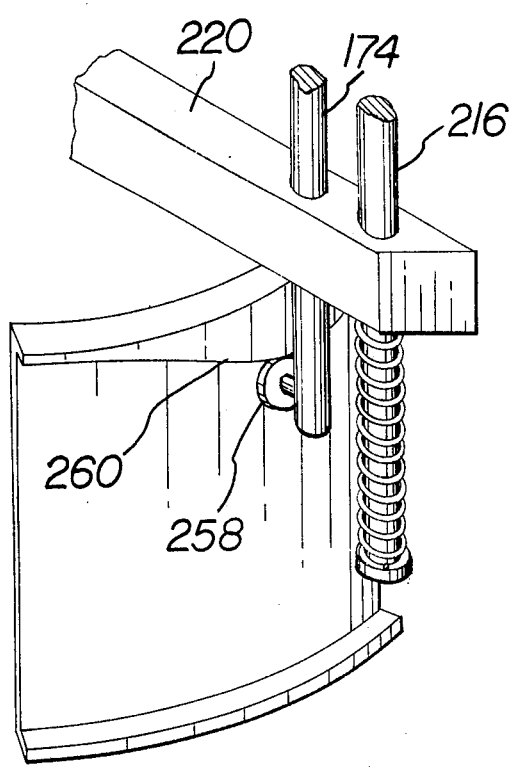
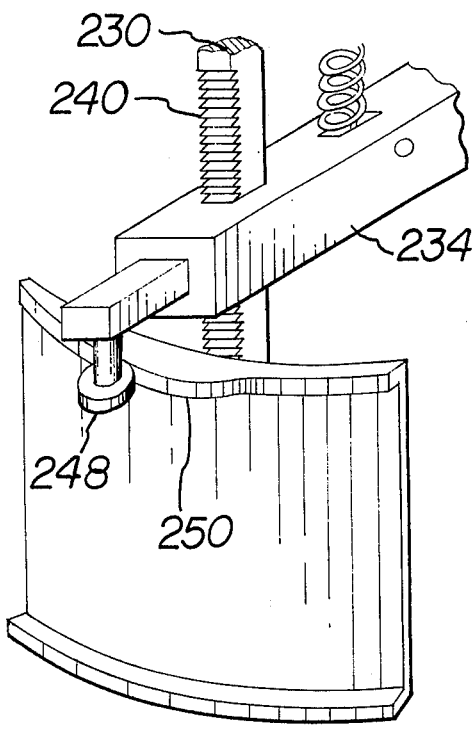

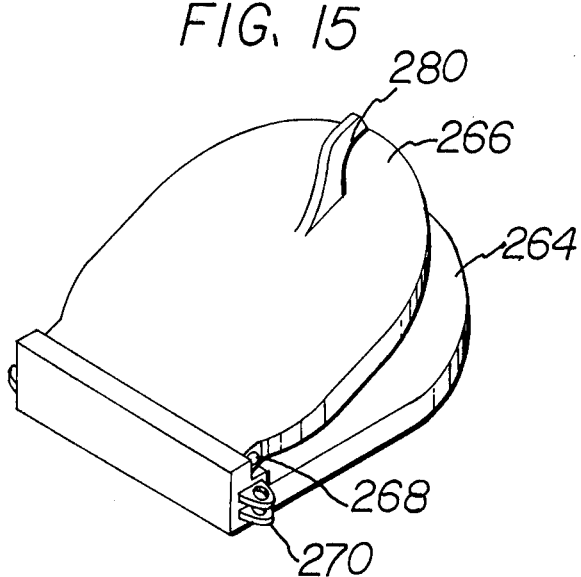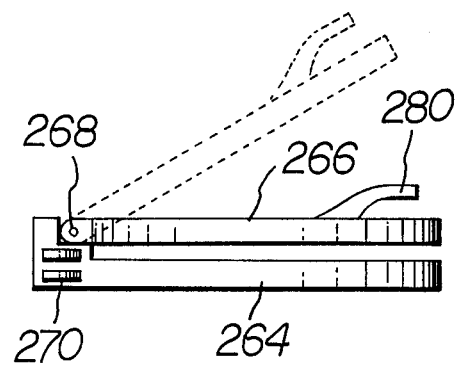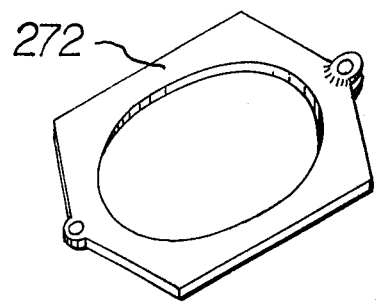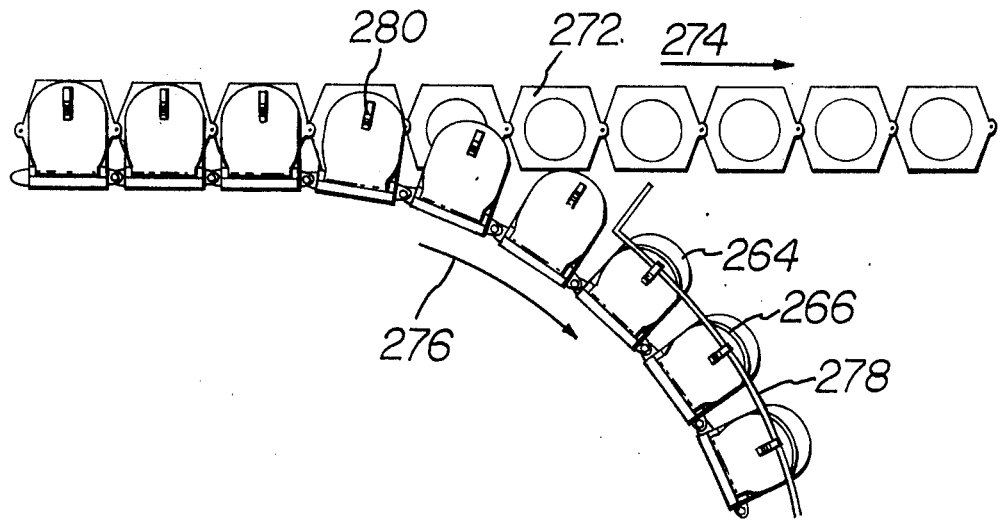

FORTUNE COOKIE MACHINE

BACKGROUND OF THE INVENTION

This invention relates to a fortune cookie machine and more particularly to a fortune cookie machine which is operable to bake a cookie and effect multiple folds therein.

Accordingly, an object of the present invention is to provide a fortune cookie apparatus for automatically baking and forming dough into the configuration of a fortune cookie.

Other features which are considered characteristic of the invention are set foth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A fortune cookie making apparatus comprises a plurality of pivotally connected carriers arranged in an endless closed loop. Means are provided for moving the carriers around the closed loop. Each of the carriers has at least one mold for receiving dough and feeding means are fixedly disposed adjacent the closed loop for feeding dough to the mold in the carriers. Paper feedig means are fixedly disposed adjacent to the closed loop for depositing a length of paper on the cookie in the mold. Actuating wheel means are disposed along the path of travel of the carriers for receiving the cookie and folding the latter along two parallel fold lines. Operating wheel means are operable to receive the cookie from the actuating wheel means and effect a second fold on the cookie to thereby form a fortune cookie.

BRIEF DESCRIPTION OF THE DRAWINGS

FIG. 6 is a partial perspective view of the apparatus for folding the fortune cookie.

FIG. 7 is a partial view of FIG. 6 showing the gripper arms in a different operating position.

FIG. 8 is a partial elevational view showing the mechanism for actuating the folding apparatus shown in FIG. 6.

FIG. 9 is a partial view, on a larger scale, of a part of the apparatus shown in FIG. 8.

FIG. 10 is a perspective view of the cam mechanism for operating the folding mechanism.

FIG. 11 is an enlarged view of a portion of the cam mechanism shown in FIG. 10.

FIG. 12 is a perspective view of the cam mechanism for releasing the folding apparatus.

FIG. 13 is a partial view on an enlarged scale of the cam mechanism shown in FIG. 12.

FIG. 14 is a plan view of an alternate arrangement of carriers which make up an endless conveyor.

FIG. 15 is a perspective view of a single carrier as used in the embodiment of FIG. 14.

FIG. 16 is a side elevational view of the individual carrier shown in FIG. 15.

FIG. 17 is a perspective view of the intermediate plate of the carrier.

DESCRIPTION OF THE PREFERRED EMBODIMENTS

Figure 1:
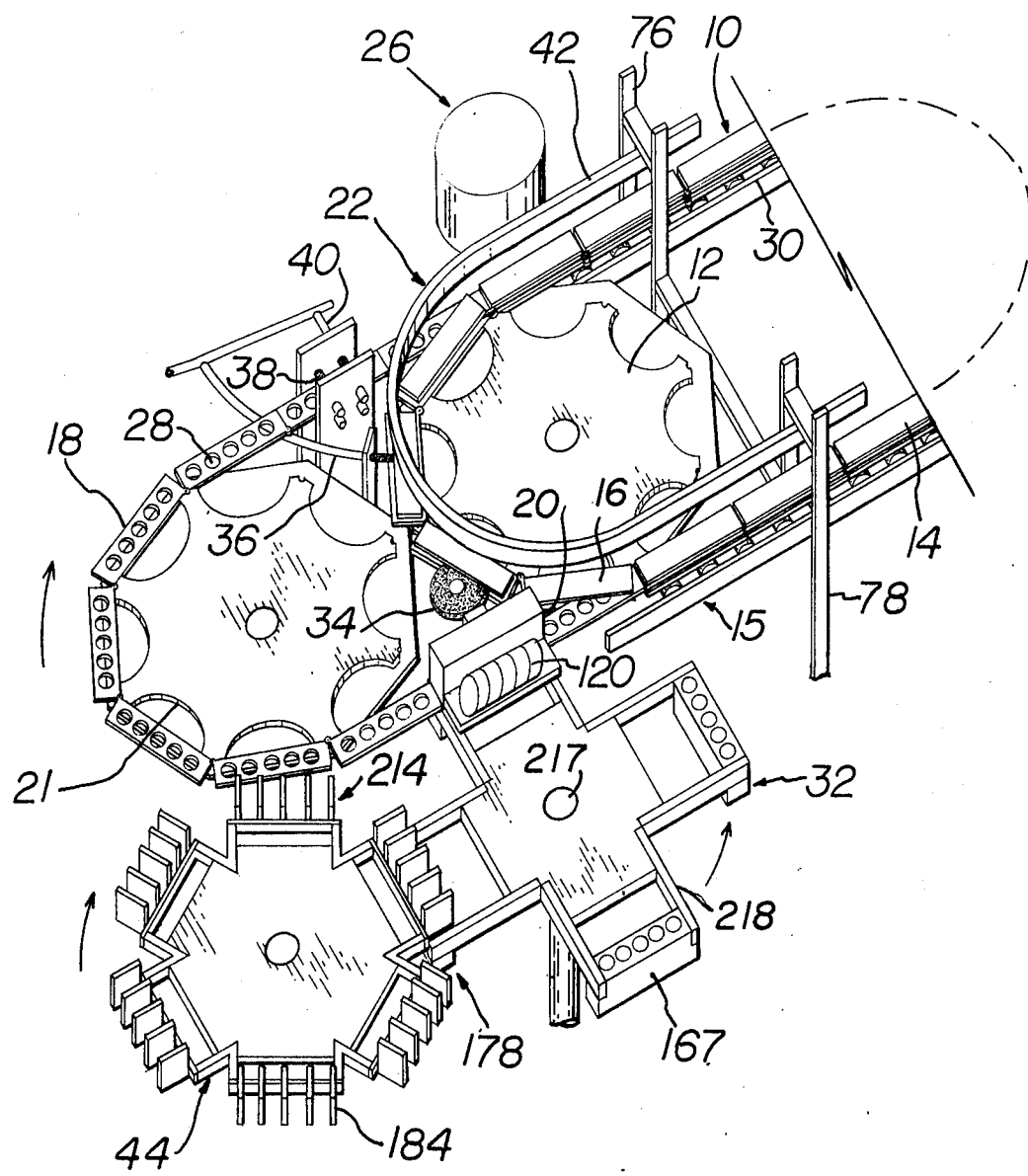
FIG. 1 is a perspective view of a fortune cookie machine according to one embodiment of the invention.

Referring to the drawings, FIG. 1 shows an endless conveyor 10 rotatable about two sprocket wheels 12. Although only one sprocket wheel 12 is shown in FIG. 1, it will be understood that there is a second sprocket wheel spaced at a distance from the first sprocket wheel 12. Thus, in FIG. 1 the broken circular line represents the remaining part of the endless conveyor 10 in which the second sprocket is included.

The endless conveyor 10 is made up of a plurality of carriers 14 each pivotally connected to one another at the inner corner thereof. Each carrier 14 includes a top plate 16 and a bottom plate 20 arranged in superimposed fashion. The top plate 16 is operatively mounted on the bottom plate 20 so that the upper plate 16 may be raised and lowered relative to the bottom plate 20 as will be explained hereinafter in greater detail.

As will be observed in FIG. 1, at a position indicated generally at 15, the top and bottom plates 16 and 20 respectively are separated from an intermediate plate 18 with a sliding action so that the upper and lower plates 16, 20 are carried around the sprocket 12 while the intermediate plate 18 continues in a straight line where it is subsequently engaged by another sprocket 21. The intermediate plates 18 are pivotally connected to one another and are carried around by the sprocket 21 to a location indicated generally at 22 where the intermediate plate 18 passes to a position between the top and bottom plates 16, 20 whereby the three plates 16, 18, 20 are united again in a sandwich relationship and continue along the endless conveyor.

As will be described in greater detail hereinafter, dough from a dough dispensing apparatus 26 is dispensed into a plurality of openings 28 in the intermediate plate 18. Once the dough has been dispensed in this manner, the top plate 16 is lowered relative to the bottom plate 20 so that the dough is included in the round mold formed by the openings 28 of the intermediate plate 18 and is confined in the round mold between the upper and lower plates 16, 20. Accordingly, the dough traverses the endless path of the conveyor where it is baked by gas or electric heaters 30 disposed beneath the endless conveyor 10. After the conveyor 10 traverses its endless path and approaches the location 15, the intermediate plate 18 containing the cooked dough in the round holes thereof is separated from the top and bottom plate 16, 20 and passes to an operating station where the dough is removed from the round openings 28 in the intermediate plate 18 and transferred to an actuating wheel 32. The intermediate plate 18, minus the baked dough, continues on its endless path around the conveyor wheel 21 to join its position intermediate the top and bottom plates 16, 20 to receive another supply of dough and thereby repeat the operation. A brush 34 is provided which passes between the separated top and bottom plates 16, 20 to clean the latter preparatory to reuse. Also a conduit 36 applies cooking oil between the two spaced plates 16, 20. Similarly, a brush 38 is provided to clean the intermediate plates 18 and cooking oil is supplied by the pipe 40 to coat the intermediate plates 18 with oil before the three plate sandwich is reformed and dough again added to the mold. As will be explained in greater detail hereinafter, a railing 42 is provided at the end of the endless conveyor 10 to provide for raising and lowering the top plates 16 relative to the lower plates 20.

As previously mentioned the fortune cookies are removed from the intermediate plate 18 and transferred to the actuating wheel 32 where a strip of paper bearing writing thereon is placed on the flat cookie and wherein the cookie is folded along two fold lines over the inserted paper. Subsequently the folded cookie is transferred to an operating wheel 44 where the folding operation is completed and the cookie is discharged.

The apparatus of the present invention is capable of being operated automatically to produce fortune cookies in which each cookie includes a strip of paper therein having a message printed thereon and in which each fortune cookie is folded in two different directions. The dough is automatically fed to the apparatus and after baking, the baked flat disc has the paper strip deposited thereon and a double fold is effected according to the present invention.

Figure 2:
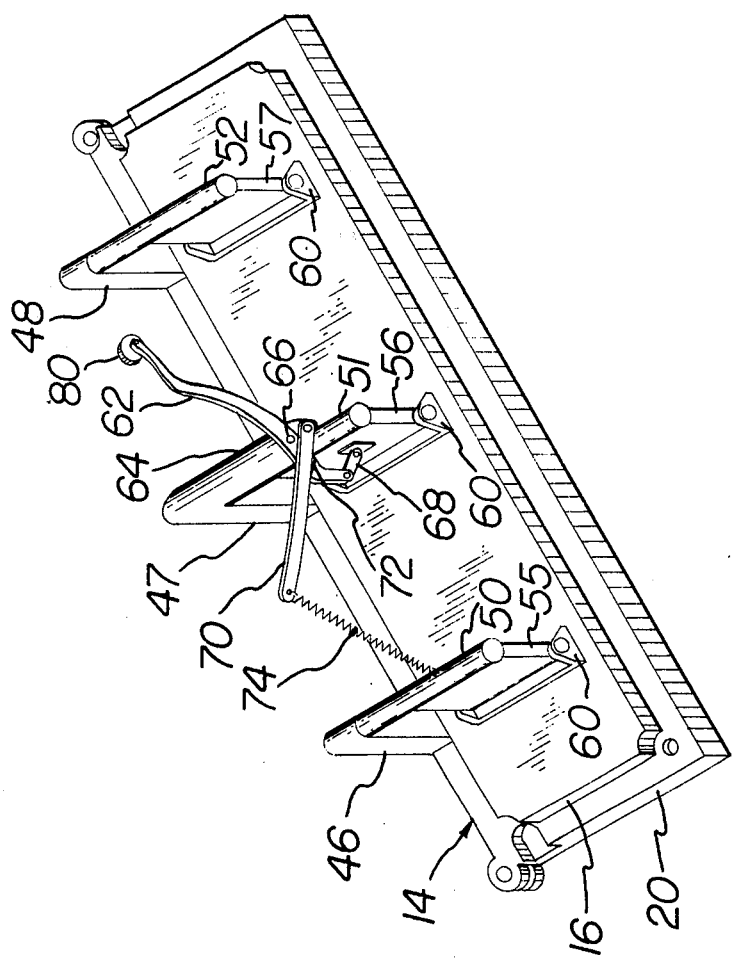
FIG. 2 is a perspective view of a carrier unit which make up the endless conveyor shown in FIG. 1.

Turning now to some of the details of construction and particularly referring to FIG. 2, it will be seen that the bottom plate 20 of the carrier 14 has three vertical posts 46, 47, 48 each of which pivotally mounts a transverse shaft 50, 51, 52 respectively overlying the top plate 16. Depending from each pivotally mounted shaft 50, 51, 52 is a link 55, 56, 57 which is pivotally connected to brackets 60 fixed on the top plate 16. Accordingly, it will be seen that the top plate 16 will rise or lower relative to the bottom plate 20 due to the aforementioned mechanical connection.

An actuating lever 62 is pivotally mounted on the end face of a transverse leg 64 integral with the intermediate post 47. The actuating lever 62 is pivotal at the pivot 66 at the end of the transverse leg 64 and is pivotally connected to an intermediate link 56 by a pivotally mounted link element 68. Accordingly, it will be seen that as the actuating lever 62 is pivoted clockwise about the pivot axis 66, as shown in FIG. 2, the upper plate 16 will be raised relative to the lower plate 20. In this regard a link 70 engages an indented notch 72 on the side of the actuating lever 62 and this link 70 is biased in a counterclockwise direction as shown in FIG. 2 by a spring 74. Accordingly, it will be seen that the link 70 biases the top plate 16 in its lower position. However, when the actuating lever 62 is pivoted clockwise about the pivot 66, the top plate 16 will be raised relative to the lower plate 20.

Referring now to FIG. 1, it will be shown that the rail 42 is supported over a portion of the endless conveyor 10 by the supports 76, 78. The elevation or height of the rail 42 is such that a roller 80 (FIG. 2) mounted at the end of the actuating lever 62 is adapted to engage the lower edge of rail 42 and thereby pivot the actuating lever 62 clockwise (as viewed in FIG. 2) and thereby raise the top plate 16 relative to the bottom plate 20. Accordingly, as the endless conveyor 10 continues further, the top and bottom plates 16, 20 travel the foreshortened path of travel around the sprocket 12 while the intermediate plate 18 containing the baked cookies continues in a further straight line to pass around the sprocket 21 as shown in FIG. 1.

Figure 3:
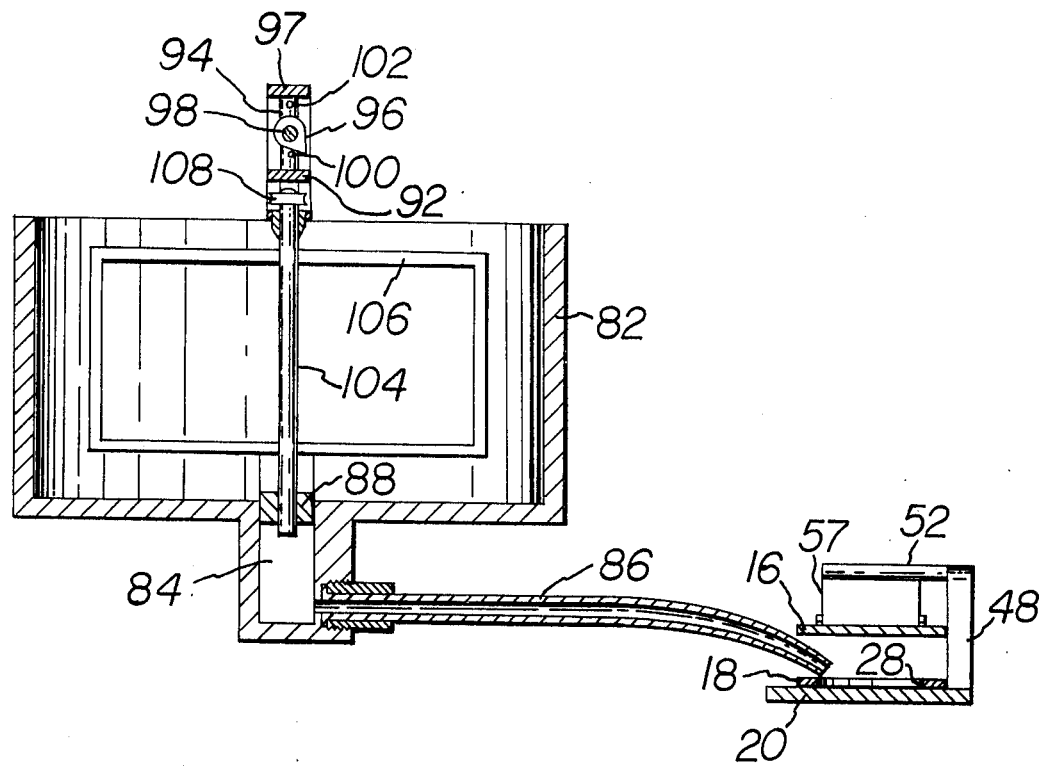
FIG. 3 is a vertical sectional view of the apparatus for feeding dough to the carrier.
Figure 4:
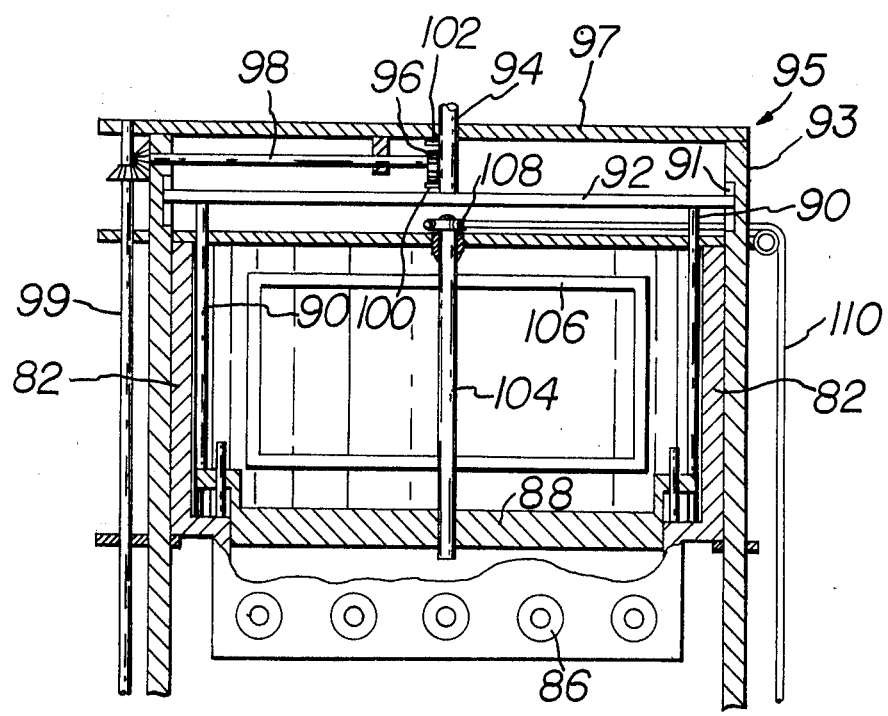
FIG. 4 is another vertical view of the apparatus for feeding the dough.

FIGS. 3 and 4 show the apparatus 26 for dispensing dough to the carrier 14. The apparatus 26 includes a tank 82 having a transverse lower trough 84 from which a plurality of nozzles 86 extend and which feed the dough to the openings 28 in the intermediate plate 18 of the carrier when the top plate 16 is in a raised position as shown in FIG. 3. An elongated bar 88 is reciprocal in the trough 84 so as to force the dough in the trough 84 through the nozzle 86 into the mold or openings 28 in the plate 18 of the carrier. The bar 88 is carried by two shafts 90 which in turn are connected to a bar 92 which is connected to a vertical shaft 94. The bar 92 has ends received in grooves 91 in the sides 93 of a frame 95. The shaft 94 is slidably received in an opening in a transverse frame element 97.

A cam 96 driven by shafts 98, 99 engages cam followers 100 and 102 on the shaft 94. It will be apparent upon reviewing FIGS. 3 and 4 that as the cam 96 is rotated by shaft 98, the cam 96 will engage the cam followers 102, 100 to raise and lower the bar 88 so that the latter is initially raised above the trough 84 so that the dough in the tank 82 will pass into the trough 84 and then subsequently the bar 88 is lowered into the trough 84 to force the dough in the trough 84 out through the nozzles 86 into the carrier mold.

A stirring mechanism in the tank 82 includes a shaft 104 and stirring elements 106 which are mounted in the tank 82. A pulley 108 is mounted on the shaft 104 and an endless belt 110 is driven by means not shown to continuously rotate the stirring mechanism.

Figure 5:
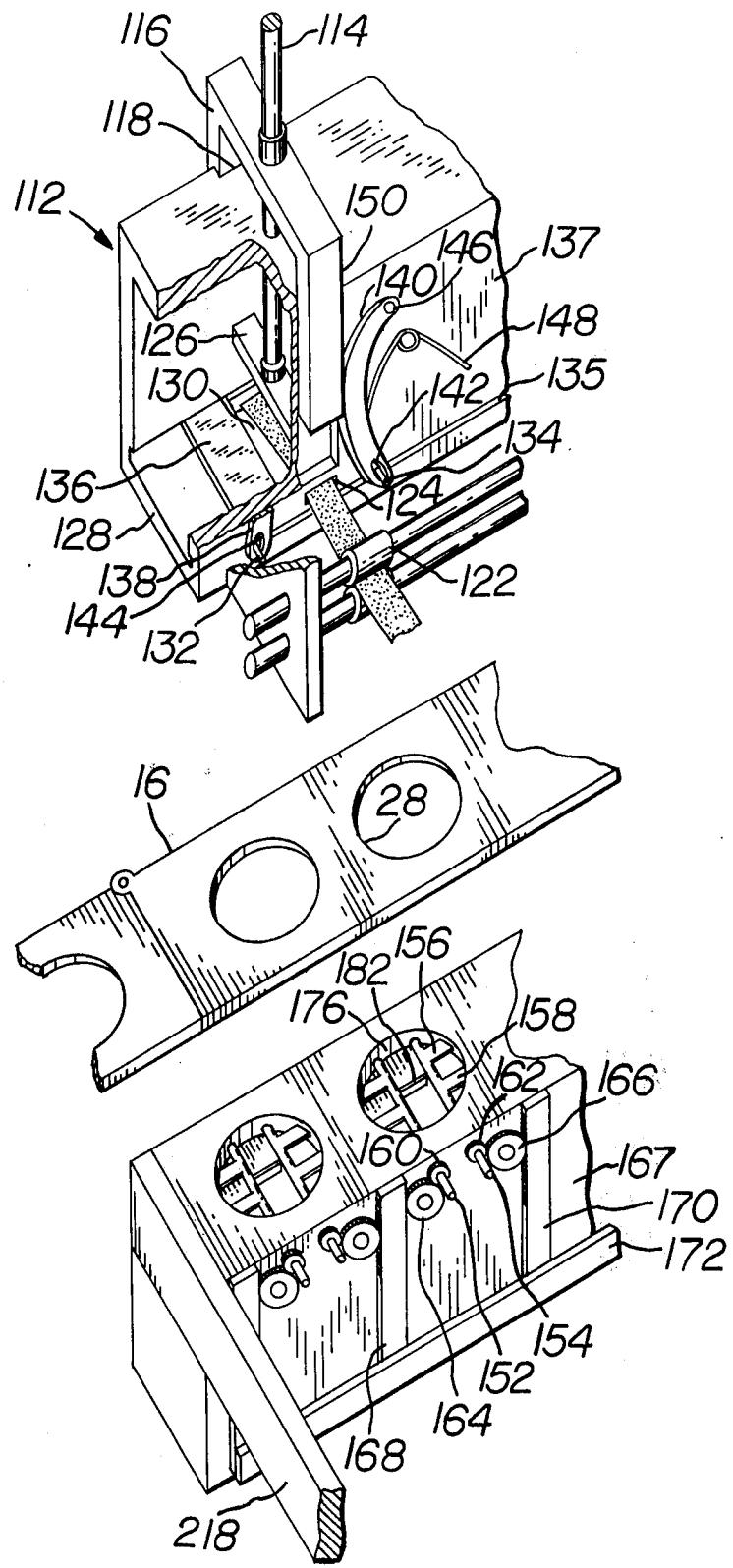
FIG. 5 is an exploded view of the apparatus for feeding the paper strips to the fortune cookie prior to folding the latter.

Turning now to FIG. 5, there is shown in the upper part thereof a paper feeding apparatus which includes a support channel 112 having an upper wall in which a shaft 114 is vertically and slidably mounted. The shaft 114 has mounted thereon an inverted U-shaped element 116 which fits in grooves 118 in the side of the support channel 112 to provide guides for the vertically slidable shaft 114. Endless lengths of paper carried in rolls as indicated at 120 in FIG. 1 are fed between the nibs of motor driven rollers 122 into an opening 124 in the side wall of the support channel 112. The rolls of paper 120 are mounted adjacent the rollers 122. The rolls of paper are shown in FIG. 1. It will be seen that when the shaft 114 is lowered, a cutter 126 mounted on the end of the shaft 114 engages the inner side surface of the support channel 112 to provide a cutting edge to thereby cut the piece of paper into the desired length.

The bottom wall 128 of the support channel 112 is provided with a plurality of openings 130 (only one shown in FIG. 5). Pivotally mounted for pivotal movement about horizontal shafts 132, 134 within each of these openings 130 are a pair of doors 136 (only one shown in FIG. 5). Each pair of doors 136 underlie a cutter 126. In this regard, it is pointed out that although the top part of FIG. 5 shows only one cutting mechanism, it will be understood that there are five identical cutting mechanisms disposed along the longitudinal length of the support channel 112, that is one cutter for each of the five openings 28 in the intermediate plate 18, so that reciprocal movement of shaft 114 along with the simultaneous reciprocal movement of the other four nonillustrated shafts 114, such as by a solenoid or the like, will simultaneously cut off five pieces of paper from five endless paper rolls 120 (FIG. 1).

The bottom wall 128 of the support channel 112 is provided with five openings 130 of which only one is shown in FIG. 5. Mounted on the support channel 112 and located in each of these openings 130 are the aforementioned pairs of slidable doors 136 (only one of which is shown in FIG. 5). The shafts 132, 134 on which these doors are mounted extend through slots 135 in the side wall 137 of the support channel 112 and arc-shaped support links 138, 140 are provided with elongated openings 142, 144 which receive the ends of the door shafts 132, 134 respectively. The arc-shaped support links 138, 140 are pivotally mounted to the outside of the side wall 137 of the support channel at the pivotal connections 146 (only one shown) and springs 148 (only one shown) mounted on the side wall 137 of the support 112 bias the arc-shaped links 138, 140 towards the downward depending leg 150 of the U-shaped member 116. Thus, it will be seen that as the legs 150 of the U-shaped member 116 are lowered, such legs 150 engage the arc-shaped links 138, 140 to separate them against the bias of springs 148 and thereby spread or separate the two doors 136 so that the piece of cut off paper can pass therethrough onto the cookie disposed in the opening 128 in the intermediate plate 18 disposed therebelow.

Thus it will be seen that as the shaft 114 is lowered, the cutter 126 will cut a length of paper while simultaneously opening the doors 136 in the bottom wall 128 of the support channel 112 so that the cut off paper can fall onto the cookie disposed in the opening 28 in the intermediate plate 18. When the shaft 114 is raised, the springs 148 will pivot the arc-shaped links 138, 140 to thereby close the doors 136.

As the cutter 126 is lowered through the opening 130 in the bottom wall 128 of the support channel 112, the cutter 126 engages or pushes the cut off paper onto the cookie in the opening 28 in the intermediate plate 16 and pushes both the paper and the cookie through the opening 28. In this regard, it will be appreciated that the cookie having been baked in the opening 28 will stick to the opening and therefore the lowering of the cutter 126 into the opening 28 will dislodge the cookie so that it will fall into a folding mechanism indicated in the lower part of FIG. 5. With regard to the above, the actuating wheel 32 shown in FIG. 1 mounts the folding mechanism shown in the lower part of FIG. 5. The paper cut off mechanism shown in the upper part of FIG. 5 is mounted in a stationary position at the location adjacent the numeral 20 in FIG. 1. Thus it will be seen that as the intermediate plates 18 pass the paper cutting mechanism, five lengths of paper are cut off, applied to the five cookies, and the latter are pushed out of the mold by the cutters 126 onto the folding mechanism of the actuating wheel 32 disposed therebelow and carried on the actuating wheel 32. As will be further described, the actuating wheel 32 is rotated in a counterclockwise direction as viewed in FIG. 1 to subsequently transfer a folded cookie to the operating wheel 44.

Turning now to the folding mechanism shown in the bottom of FIG. 5, it will be seen that the folding mechanism for each opening 28 in the intermediate plate 18 includes a pair of rotatably mounted shafts 152, 154 each of which includes two lateral webs 156, 158. Each shaft 152, 154 has a gear 160, 162 which meshes with another gear 164, 166 respectively, the latter being rotatably mounted on the side of the folding support casing 167. Rack elements 168, 170 engage the gears 164, 166 respectively so that up and down movement of the rack elements 168, 170 will rotate the shafts 152, 154. All of the racks 168, 170, etc. may be connected to a cross bar 172 so that reciprocation of the cross bar 172 by a rod 174 (FIG. 8) as will hereinafter be described, will simultaneously operate all of the racks 168, 170, etc.

As the fortune cookie falls into the opening 176 in the folding support casing 167, the racks 168, 170 are actuated so that the shafts 152, 154 are pivoted up to approximately 180° so that the fortune cookie is folded along two parallel fold lines corresponding to the axis of the two shafts 152, 154, whereby the cookie is folded on itself on the two fold lines. By way of example, it will be seen in FIG. 5 that the shaft 152 is pivoted clockwise and the shaft 154 counterclockwise to fold and cause portions of the cookie to double over on itself with the previously described paper disposed therebetween. At this point the cookie is soft and has the consistency to be folded in this manner.

After the baked but still soft cookie receives this first fold along the two fold lines, the actuating wheel 32 has been rotated 90 degrees to a transfer station 178 where it is aligned with the second folding mechanism on the operating wheel 44. The transfer station is indicated generally at 178 in FIG. 1 and is also shown in FIG. 8. Thus, spoke elements 218 which extend radially from the shaft 217 (FIG. 1) of the actuating wheel 32 support the folding support casing 167. After the cookie has been folded in the first folding operation as described above and the actuating wheel 32 rotated to the transfer station 178, a lift bar 182 (FIGS. 5 and 8) disposed between the two shafts 152, 154 is raised to engage a central portion of the folded over cookie and push it upwardly. As the cookie is pushed upwardly it is transferred to the folding mechanism on the operating wheel 44 while simultaneously effecting a second fold to the fortune cookie. Thus, the second fold is made during the transfer from actuating wheel 32 to operating wheel 44.

Turning now to the operating wheel 44 for effecting the second fold, the latter mounts a plurality of vertically spaced plates 184. Mounted on these plates 184 are a pair of gripper bars 186, 188 pivotally mounted at 190, 192 respectively. Springs 194, 196 are also mounted on the plates 184 and pivotally bias the gripper bars 186, 188 in a pivotal direction. Thus it will be seen that the springs 194, 196 pivotally bias the gripper bars 186, 188 tending to cause the lower portions of the gripper bars to be separated.

A rod 198 is reciprocally mounted between the gripper bars 186, 188 in a guide 200 extending from the plate 184. The rod 198 has a wedge 202 disposed such that when the rod 198 is raised, the wedge 202 will engage the surfaces 204, 206 of the gripper bars 186, 188 to pivot the latter so that the bias of the spring 194, 196 is overcome and the lower longitudinal ends of the gripper bars 186, 188 approach one another.

The lower portion of the gripper bars 186, 188 mount transverse, contact elements 208, 210 which engage the fortune cookie. These contact elements 208, 210 have an arcuate surface as best can be seen in FIG. 6.

Mounted on the end of the rod 198 is a pusher bar 212 which discharges the cookie from the operating wheel 44 as will be described hereinafter.

During the transfer of the cookie from actuating wheel 32 to operating wheel 44, the lift bar 182 on actuating wheel 32 is raised to lift the double folded cookie containing the paper from the opening 176 (FIG. 5) in the first folding support casing 167 and as the cookie is elevated, it passes between the contacting elements 208, 210 of the gripper bars 186, 188 mounted on the operating wheel 44. As the cookie passes between the gripper bars 186, 188 the rod 198 is raised, as will be described hereinafter, the contact elements 208, 210 approach one another to thereby engage the sides of the cookie and push the latter together to effect the second fold as can best be shown in FIG. 7. In this regard, the timing of this transfer operation is such the the cookie is first raised by the lift bar 182 so that the upper portion of the cookie passes up past the elevation of the contact elements 208, 210 and then after this occurs, the gripper bars approach one another to thereby push the end portions of the cookie towards one another to thereby effect the double fold of the fortune cookie.

It will be appreciated that the contact elements 208, 210 do not contact one another but merely contact the fortune cookie and fold the latter just sufficiently so that the ends approach one another but do not contact one another to thereby provide the configuration of the well known fortune cookie.

After the second fold has been effected, as described hereinabove, the operating wheel 44 is rotated to a discharge station as indicated at 214 (FIG. 1). As the operating wheel 44 is rotated from the transfer station 178 to the discharge 214, the cookie is supported by the contact elements 208, 210 of the gripper bars. However, at the discharge station 214, the rod 198 is lowered so that the gripper bars 186, 188 thereby are pivoted by the bias of the springs 194, 196 to separate the contact elements 208, 210. At the same time that the contact elements are separated to release the cookie, the pusher bar 212 at the end of the rod 198 engages the cookie to push it downwardly to discharge it into a tray or other collection utensil such as a conveyor or the like where it then may be put in a box or other container.

Referring to FIGS. 8 to 13, the lift bar 182 is connected to a shaft 216 which is reciprocally mounted on the actuating wheel 32 within the two spoke elements 218, 220 which are part of the actuating wheel 32. The shaft 216 is normally biased in its lower position by a spring 222 which engages a stop 224 secured to the shaft 216. Accordingly, the shaft 216 is adapted to be raised by an actuating member 226 such as a solenoid or the like to raise the lift bar 182 as previously described to facilitate effecting the second fold in the fortune cookie.

The reciprocal rod 198 is connected to an inverted U-shaped element having a cross bar 228 and a downward depending shaft 230 reciprocally mounted in spoke elements 232, 234 which are part of the operating wheel 44. The shaft 216 and shaft 230 have lugs 236 and 238 respectively. Accordingly, it will be seen that as the shaft 216 is raised, the lug 236 thereon will engage the lug 238 on shaft 230 to thereby raise the latter and also raise the rod 198. After the rod 198 is raised, it is temporarily held in its raised position by a rack 240 and spring biased rack engaging plunger 242. Thus the rack engaging arrangement includes the reciprocally mounted plunger 242 and a spring 244 biasing the plunger 242 into engagement with the rack 240.

A lateral shaft 246 on the plunger 242 has a cam follower 248 which is adapted to be engaged by a cam 250 (FIGS. 12 and 13) as will be further described, to disengage the plunger 242 from the rack 240 and thereby allow the shaft 230 to move to its downward position to thereby cause the rod 198 to move downwardly and discharge the cookie from between the gripper bars 186, 188.

The actuating wheel 32 also mounts the previously described rod 174 for actuating the doors 136 in the support channel 112. The rod 174 is mounted for reciprocal movement in the spoke elements 218, 220 of the actuating wheel 32 and the rod 174 is biased in an upward direction by a spring 252 which engages a stop 254 fixed to the rod 174. A stop 256 secured to the rod 174 limits its upward position. A cam 258 on the lower end of the rod 174 is adapted to be actuated by a cam 260 (FIGS. 10 and 11) to lower the rod 174 and thereby move the rod 174 downwardly to thereby rotate the gears 160, 162 (FIG. 5) and thereby open the doors 136 in the support chamber 112 as previously described.

Referring to FIG. 10, there is shown a main shaft 262 of the actuating wheel 32 which includes the four spoke elements 220 and which reciprocally mount the shafts 174 and 216. The cam 260 is fixed in a stationary position and is adapted to engage the cam follower 258 to lower the shaft 174 as will be apparent on viewing FIG. 11. Accordingly, it will be seen that as the actuating wheel 32 is rotated past the fixed cam 260, the cam follower 258 will engage the cam 260 and lower the shaft 174 to thereby actuate the gears 160, 162 (FIG. 5) and open the doors 136 in the support channel 112.

FIG. 12 shows six spoke elements 234 which are part of the operating wheel 44 and also shows the fixed cam 250 which is adapted to engage the cam follower 248 to release the rack 240 on the shaft 230 as previously described. Accordingly, it will be seen that as the operating wheel 44 rotates and the cam follower 248 engages the fixed cam 250, the rack 240 will be released at the proper location to cause the pusher bar 212 to be lowered and discharge the fortune cookie.

FIGS. 14 to 17 show an alternate embodiment. In this alternate embodiment, the endless conveyor is made up of individual carriers instead of carriers having five molds therein. Thus FIG. 15 shows an individual carrier having a bottom plate 264 to which a top plate 266 is pivotally mounted about the pins 268. Links 270 are provided on the side to pivotally connect the carriers in an endless conveyor as shown in FIG. 14.

FIG. 17 shows the intermediate plate 272 which is adapted to pass between the top and bottom plates 266, 264 and in which the fortune cookie is initially baked as described in detail hereinbefore.

As shown in FIG. 14, the joined and linked intermediate plates 272 pass through a longer path of travel 274 as the carriers constituted by the top and lower plates pass around the path 276. As can be seen in FIG. 14, a rail 278 is provided at a suitable position and elevation to engage an upward projecting hook 280 on each top plate 266 so that as the carrier moves along their endless path, the hooks 280 on the carriers engage the rail 278 and gradually raise up on the rail 278 to thereby lift the top plate 266 and pivot it relative to the bottom plate 264 to effect the separation of the top and bottom plate as described hereinabove. The operations of the remainder portions of this alternate embodiment are as described in connection with the main embodiment.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. Fortune cookie making apparatus comprising a plurality of pivotally connected carriers arranged in a first endless closed loop, first drive means operable engageable with said carriers to move the carriers about said first closed loop, each of said carriers comprising a bottom plate and a top plate, means pivotally mounting said top plate on said bottom plate to provide for raising of said top plate relative to said bottom plate, engageable means on said carrier, lift means disposed along a section of said first closed loop and being operably engaged by said lift means to raise said top plate relative to said bottom plate, a plurality of pivotally connected intermediate plates arranged in a second endless closed loop, second drive means operably engageably with said intermediate plates to move the intermediate plates about said second loop, a first portion of said first closed loop being coincident with a first portion of said second closed loop such that said intermediate plates are disposed between respective top and bottom plates of said carriers along said first portions of said first and second closed loops, said second closed loop having a second portion defining a path of travel for said intermediate plates which is different from the path of travel of said carriers about said first closed loop, said intermediate plates having mold openings for receiving dough, feeding means fixedly disposed adjacent said second loop for feeding dough to said mold openings in said intermediate plates, paper feeding means disposed adjacent said second closed loop for depositing a length of paper on the cookie in said mold opening, an actuating wheel disposed adjacent said second closed loop, first folding means mounted on said actuating wheel and operable to receive said cookie from said mold openings and fold the cookie along two parallel fold lines, an operating wheel disposed adjacent to said actuating wheel, and second folding means mounted on said operating wheel and operable to receive said cookie from said first folding means and to effect a second fold on said cookie to thereby form a fortune cookie.

2. Fortune cookie making apparatus according to claim 1 including means along said first closed loop for cleaning and applying oil to said carriers.

3. Fortune cookie making apparatus according to claim 1 wherein said engageable means comprises a lever pivotally supported from said bottom plate and pivotally connected to said top plate, a roller means mounted on said lever, said lift means comprising a fixed rail coincident with a section of said first closed loop, said rail being engaged by said roller means to effect raising of said top plate relative to said bottom plate.

4. Fortune cookie making apparatus according to claim 1 wherein said first loop has a second portion defining a path of travel for said carriers which is different from the path of travel of said intermediate plates along said second closed loop.

5. Fortune cookie making apparatus according to claim 1 wherein said paper feeding means comprises a support channel, means for feeding an endless paper strip to said support channel, a reciprocal cutter mounted on said support channel for cutting said endless paper, and sliding door means mounted on said support channel operable to be opened to permit passage of the cut paper to said intermediate plate disposed therebelow.

6. Fortune cookie making apparatus according to claim 1 wherein said first folding means comprises a casing, and a pair of pivotally mounted folding elements operable to fold a round flat cookie about two parallel axes.

7. Fortune cookie making apparatus according to claim 6 wherein said second folding means comprises pairs of pivotally mounted gripper bars, reciprocal wedge means operable to pivot said gripper bars, said gripper bars being operable to receive said folded cookie from said first folding means on said actuating wheel and effect a double fold thereto generally transversely of the first mentioned fold.

8. Fortune cookie making apparatus according to claim 1 comprising heating means along said first portion of said closed loop to bake said fortune cookies as the carriers traverse said first portion of said first closed loop.

9. Fortune cookie making apparatus according to claim 1 wherein said top and bottom plates close off said mold openings in said intermediate plates to form a mold for said dough as the latter is baked upon travelling along said first portion of said first closed loop.

* * * * *